United States Patent [19]

Schröter et al.

[11] Patent Number: 5,498,589
[45] Date of Patent: Mar. 12, 1996

[54] PROCESS FOR THE PRODUCTION OF CARBON MOLECULAR SIEVES

[75] Inventors: Hans-Jürgen Schröter, Mühlheim/Ruhr; Heinrich Heimbach, Duisburg; Klaus-Dirk Henning; Karl Knoblauch, both of Essen; Alfons S.-S. Berndt, Bad Bentheim; Ferdinand Tarnow, Duisburg, all of Germany

[73] Assignee: Bergwerksverband GmbH, Essen, Germany

[21] Appl. No.: 211,207

[22] PCT Filed: Oct. 1, 1992

[86] PCT No.: PCT/EP92/02275

§ 371 Date: Mar. 21, 1994

§ 102(e) Date: Mar. 21, 1994

[87] PCT Pub. No.: WO93/06920

PCT Pub. Date: Apr. 15, 1993

[30] Foreign Application Priority Data

Oct. 4, 1991 [DE] Germany .................... 41 32 971.6

[51] Int. Cl.⁶ .................................... B01J 20/20
[52] U.S. Cl. ............... 502/416; 502/429; 502/430; 502/431; 502/433; 502/436; 502/437; 423/445 R; 95/902
[58] Field of Search ............... 423/445 R; 502/416, 502/429, 430, 431, 433, 436, 437; 95/902

[56] References Cited

U.S. PATENT DOCUMENTS

| | | | |
|---|---|---|---|
| 3,951,856 | 4/1976 | Repik et al. | 252/421 |
| 3,979,330 | 9/1976 | Münzer et al. | 252/445 |
| 4,102,812 | 7/1978 | Robinson et al. | 252/451 |
| 4,880,765 | 11/1989 | Knoblauch et al. | 502/432 |
| 4,921,831 | 5/1990 | Nakai et al. | 502/418 |
| 5,248,651 | 9/1993 | Henning et al. | 502/432 |

FOREIGN PATENT DOCUMENTS

| | | |
|---|---|---|
| 0102902A1 | 3/1984 | European Pat. Off. . |
| 0366796A1 | 5/1990 | European Pat. Off. . |
| 3618426C1 | of 0000 | Germany . |
| 3006171B1 | of 0000 | Germany . |
| 2119829B2 | 11/1972 | Germany . |

Primary Examiner—E. Rollins Cross
Assistant Examiner—Timothy H. Meeks
Attorney, Agent, or Firm—Herbert Dubno; Jonathan Myers

[57] ABSTRACT

A process is disclosed for preparing a carbon molecular sieve used for the separation of oxygen from nitrogen, which comprises the steps of:

(a) milling hard coal to a grain size of 95%<20µm;

(b) oxidizing the finely milled hard coal with air in a fluidized bed;

(c) adding water and coal tar pitch as a binder and molding the finely milled hard coal into shape;

(d) carbonizing the finely milled hard coal molded into shape in a rotary kiln at a temperature of 500° to 850° C., with a dwelling time of 55 to 65 minutes, in order to obtain a carbonization product with a bulk density of 530 to 560 g/l;

(e) activating the carbonization product with steam at to 900° C. for 165 to 195 minutes to obtain a sintered carbonaceous product having a bulk density of 590 to 650 g/l; and (f) treating the sintered carbonaceous product at 750 to 850° C. with carbon-splitting hydrocarbons to obtain said carbon molecular sieve.

2 Claims, No Drawings

PROCESS FOR THE PRODUCTION OF CARBON MOLECULAR SIEVES

SPECIFICATION

1. Field of the Invention

The invention relates to a process for producing carbon molecular sieves.

2. Background of the Invention

From German Patent 36 18 426 and German Patent 21 19 829 mentioned therein it is known to produce carbon molecular sieves for the separation of gases with small molecular size, particularly $O_2$ and N2, in the following manner: finely ground hard coal is oxidized with air in a fluidized bed. After adding coal-tar pitch as a binder and water, the coal is molded and carbonized at temperatures up to 900° C., subsequently activated with steam at temperatures of 800°–900° C. and the preliminary product of the low-level activation is treated with carbon splitting hydrocarbons at 750°–850° C.

The carbon molecular sieves produced this way are used for obtaining nitrogen from air in pressure swing processes. The operating costs of pressure swing processes consist primarily of compression costs for the required air compression. The so-called specific air consumption, i.e. the ratio of the used amounts of air to the produced amount of nitrogen ($m^3$ air/$m^3$ nitrogen) should be as low as possible. This specific air consumption is directly related to the nitrogen adsorptivity of the carbon molecular sieve, which results from the difference between the diffusion rates of nitrogen and oxygen in the carbon molecular sieve.

In order to establish the characteristics of carbon molecular sieves, up to now test methods have been used which take into account the differences in the diffusion rates of the gases to be separated.

In German Patent 36 18 426 and German Patent 21 19 829 a quality test is disclosed, wherein a certain volume of carbon molecular sieve (e.g. 200 ml) which has been previously evacuated, is traversed by air for instance for 1 minute and subsequently evacuated for 1 minute. Subsequently the absorbed amount of gas is measured and the maximum oxygen concentration as well as the average oxygen concentration in the evacuated gas is determined (CMS-"quality test").

However, the best way to prove the quality of a carbon molecular sieve is to perform practice-related pressure swing tests in a pressure swing installation. Thereby it is important that the amount of air required for obtaining 1 $m^3$ of nitrogen be as low as possible. At the same time the tendency is to keep the nitrogen amount produced per cubic meter of CMS volume as high as possible, in order to be able to keep the volume of the adsorber as small as possible. Consequently the air/nitrogen ratio L/N ($m^3$ (i.N) air/$m^3$ (i.N>) $N_2$) as well as the nitrogen production ratio ($m^3$ (i.N) $N_2$/$m^3$ CMS×h) are the quality features for a carbon molecular sieve for the separation of nitrogen.

OBJECT OF THE INVENTION

It is the object of the invention to produce a carbon molecular sieve by means of which in the pressure swing process particularly low air/nitrogen ratios and particularly high specific yields of nitrogen can be obtained.

SUMMARY OF THE INVENTION

Through tests it has been found that carbon molecular sieves having these properties can be produced in that a. the hard coal is ground to a grain size of 95%<20μm b. the carbonization is performed in a rotary kiln at temperatures between 500° and 850° C. with a dwelling time of 55 to 65 minutes, in order to obtain a bulk density of 530–560 g/l and c. the carbonization product is activated with steam at 850° to 900° C. for 165 to 195 minutes, until through the steam gasification and sintering a bulk density between 590 and 650 g/l is reached.

It has been found that when a coal finely ground to a grain size of 95%<20μm is used in the production of carbon molecular sieves, low rates of air consumption and high nitrogen production can be achieved.

For the quality of the carbon molecular sieve it is also very important to follow the bulk density requirements during the carbonization and activation. Thereby the dwelling time of the carbonization product in the rotary kiln is set so that the activated product will absorb five to six times the volume of air in a quality test and that during the desorption of this air a maximum oxygen concentration in the desorbed gas of 23% by volume is established. This means that the activated product has a low separation effect for oxygen and nitrogen (oxygen concentration in the air 21% by volume). As shown in the examples, this separation effect in the quality test is allowed to lead to a maximum oxygen concentration of 23% by volume in the desorbed gas.

By these special preliminary treatment steps an initial pore structure is established which is particularly favorable for the treatment with carbon splitting hydrocarbons, which react by narrowing already existing pores in the carbon network of cokes.

The grinding of hard coal to a grain size of 95%<20μm is very expensive. For this type of grinding primarily vibrating mills and jet mills are used. The ground product has then to be separated by air separation.

According to a further development of the invention process, the filter dust resulting from an activated carbon filtering plant is used as ground hard coal.

For the production of activated carbon also hard coal is used, which is oxidized with air in a fluidized bed. During the operation of the fluidized bed, the fraction of the finest dust is evacuated from the fluidized bed and deposited in the filter system (cloth filters). This filter dust has a grain size of 95%<20μm and is therefore a suitable product to be used in the process of the invention.

The quality of the produced carbon molecular sieves was tested in a standard pressure swing installation ("pressure swing test"). Thereby the nitrogen production rate ($m^3$ (i.N) $N_2$/$m^3$ CMS×h) and the air/nitrogen ratio ($m^3$ (i.N.) air/$m^3$ (i.N.) $N_2$ are established.

| Condition of the pressure swing installation: | |
| --- | --- |
| Adsorber volume | 2 × 4 ltr. |
| Adsorption pressure | 8 bar |
| Desorption pressure | 1 bar |
| Duration of cycle | 2 × 60 seconds |
| Pressure compensation between the two adsorbers: | 1 second |
| $N_2$-backflooding during pressure buildup with air | 20° C. |
| Test temperature | |

EXAMPLE 1

Hard coal is ground one time to a grain size of 100%<80μm (Charge 1A) and one time to a grain size of 95%<20μm (Charge 1B) and both products are oxidized with air in a fluidized bed. The oxidized coal is subsequently mixed with pitch and water and extruded in an extruder to molded bodies. Subsequently both products are treated the same way in rotary kilns up to a final carbonization temperature of 880° C. and after that activated with steam. The dwelling time in the rotary kiln was extended for Charge 1B compared to the dwelling time for Charge 1A. The activated products show the following characteristics:

|  | Charge 1A | Charge 1B |
|---|---|---|
| Bulk density | 668 g/l | 626 g/l |
| max. $O_2$ conc. | 22.5% by vol. | 22.3% by vol. |

The activated products are subsequently treated with benzene and then tested in a pressure swing installation. The results of this pressure swing test can be seen in Table 1.

TABLE 1

| PSA test results in | Charge 1A (conventional) | | | Charge 1B (according to invention) | | |
|---|---|---|---|---|---|---|
| various $N_2$ purities | 0.1 | 0.5 | 1% $O_2$ | 0.1 | 0.5 | 1% $O_2$ |
| $N_2$ yield N ($Nm^3/m^3$ CMSxh) | 55 | 100 | 130 | 78 | 117 | 133 |
| Air consumption L/N | 5.1 | 3.2 | 2.8 | 3.6 | 2.75 | 2.50 |

From Table 1 it can be seen that the carbon molecular sieve produced from the finer grind of hard coal (Charge 1B) clearly produced more nitrogen while having a considerably lower air consumption and thereby lower energy consumption than the conventional product (Charge 1A).

EXAMPLE 2

A carbonization product produced as in Example 1 Charge 1B is activated in a different way with steam in a rotary kiln. The temperature in the rotary kiln was in both cases an average of 890° C. Through different metered additions of the carbonization product, different dwelling times in the rotary kiln were reached, so that two different activates result according to the quality test:

Both activates absorb in the quality test an amount of air equal to 5.5 times their volume. However, in the desorption in activate 2A a maximum oxygen concentration of 24.2% by volume is measured in the desorption gas, while in activate 2B this concentration amounts only to 22.1% by volume. After subsequent treatment with benzene, carbon molecular sieves result which yield the following results in the pressure swing apparatus:

| PSA test results at 0.1% $O_2$ | CMS from activate 2A | CMS from activate 2B (of the invention) |
|---|---|---|
| $N_2$-yield N | 52.1 | 59.0 |
| Air consumption ($Nm^3$ air/$Nm^3$ $N_2$) | 4.65 | 4.26 |

From this example it can be seen that when the activation is performed according to the invention an improved carbon molecular sieve results.

EXAMPLE 3

The filter dust having a grain size of 95% < 20/um has been removed from the oxidation ovens (fluidized bed) of an activated carbon filtering plant and further processed to carbon molecular sieves. In the pressure swing test the following values result:

|  | Filter dust CMS | |
|---|---|---|
| PSA test results | 0.1% $O_2$ | 0.5% $O_2$ |
| $N_2$ yield | 78.6 | 105 |
| Air consumption | 3.6 | 2.8 |

From the table it can be seen that the carbon molecular sieves produced from filter dust show similar values with the ones produced from hard coal ground according to the invention (Example 1, Charge 1B). Thus it shows clearly better values than a carbon molecular sieve produced from hard coal with a grain size of 100%<80μm (Example 1, Charge 1A).

What is claimed is:

1. A process for preparing a carbon molecular sieve used for the separation of oxygen from nitrogen, which comprises the steps of:

(a) milling hard coal to a grain size of 95%<20μm;

(b) oxidizing the finely milled hard coal with air in a fluidized bed;

(c) adding water and coal tar pitch as a binder and molding the finely milled hard coal into shape;

(d) carbonizing the finely milled hard coal molded into shape in a rotary kiln at a temperature of 500° to 850° C., with a dwelling time of 55 to 65 minutes, in order to obtain a carbonization product with a bulk density of 530 to 560 g/l;

(e) activating the carbonization product with steam at to 900° C. for 165 to 195 minutes to obtain a sintered carbonaceous product having a bulk density of 590 to 650 g/l; and (f) treating the sintered carbonaceous product at 750° to 850° C. with carbon-splitting hydrocarbons to obtain said carbon molecular sieve.

2. A process for preparing a carbon molecular sieve used for the separation of oxygen from nitrogen, which comprises the steps of:

(a) obtaining filter dust having a grain size of 95%<20μm from an activated carbon filtering plant;

(b) oxidizing the filter dust with air in a fluidized bed;

(c) adding water and coal tar pitch as a binder and molding the filter dust into shape;

(d) carbonizing the filter dust molded into shape in a rotary kiln at a temperature of 500° to 850° C., with a dwelling time of 55 to 65 minutes, in order to obtain a carbonization product with a bulk density of 530 to 560 g/l;

(e) activating the carbonization product with steam at to 900° C. for 165 to 195 minutes to obtain a sintered carbonaceous product having a bulk density of 590 to 650 g/l; and (f) treating the sintered carbonaceous product at 750° to 850° C. with carbon-splitting hydrocarbons to obtain said carbon molecular sieve.

\* \* \* \* \*